United States Patent
Evans

(10) Patent No.: US 10,099,880 B2
(45) Date of Patent: Oct. 16, 2018

(54) METHOD AND APPARATUS FOR WINDING STRAPS

(71) Applicant: MONSTER DEVICES INC., Peachland (CA)

(72) Inventor: Ryan Wynn Evans, Peachland (CA)

(*) Notice: Subject to any disclaimer, the term of this patent is extended or adjusted under 35 U.S.C. 154(b) by 0 days.

(21) Appl. No.: 15/286,373

(22) Filed: Oct. 5, 2016

(65) Prior Publication Data

US 2017/0022020 A1  Jan. 26, 2017

Related U.S. Application Data

(63) Continuation-in-part of application No. 14/796,926, filed on Jul. 10, 2015.

(51) Int. Cl.
| | |
|---|---|
| *B65H 18/10* | (2006.01) |
| *B65H 18/04* | (2006.01) |
| *B65H 54/58* | (2006.01) |
| *B60P 7/08* | (2006.01) |

(52) U.S. Cl.
CPC ............. *B65H 18/10* (2013.01); *B65H 18/04* (2013.01); *B65H 54/585* (2013.01); *B60P 7/0846* (2013.01); *B65H 2403/50* (2013.01); *B65H 2701/1842* (2013.01); *B65H 2701/375* (2013.01)

(58) Field of Classification Search
CPC ........ B60P 7/0846; B60P 1/60; B65H 54/585; B65H 75/4486; B65H 18/04; B65H 18/10; B65H 2403/50; B65H 2701/1842; B65H 2701/375
USPC ............................ 242/539, 532.6, 404.2, 406
See application file for complete search history.

(56) References Cited

U.S. PATENT DOCUMENTS

| | | | | |
|---|---|---|---|---|
| 3,113,742 | A * | 12/1963 | Bevan ..................... | H04L 13/06 242/539 |
| 3,185,407 | A * | 5/1965 | Lichtenstein .......... | B65H 16/06 242/129.53 |
| 3,222,006 | A * | 12/1965 | Bahnsen ................ | B65H 18/10 242/413.2 |
| 3,954,226 | A * | 5/1976 | Pickering .............. | B60P 7/0846 242/395 |
| 5,533,689 | A * | 7/1996 | Chalfant ................ | B65H 18/10 242/532.5 |
| 5,551,647 | A * | 9/1996 | Browning ............ | B65H 49/305 242/118.5 |
| 5,611,520 | A * | 3/1997 | Soderstrom ............. | B60P 7/083 24/68 CD |
| 6,068,210 | A * | 5/2000 | Risa ...................... | B65H 54/585 242/395 |
| 6,705,597 | B1 * | 3/2004 | Reilly ................... | B60P 7/0846 254/223 |
| 6,729,604 | B1 * | 5/2004 | Claycomb ............. | B60P 7/0846 24/68 R |
| 6,908,060 | B2 * | 6/2005 | Hibbs ................... | B65H 49/305 242/129 |

(Continued)

*Primary Examiner* — Michael R Mansen
*Assistant Examiner* — Mark K Buse
(74) *Attorney, Agent, or Firm* — Richard D. Okimaw

(57) ABSTRACT

An apparatus for winding straps comprises a motor having a shaft extending therefrom to a distal end, the shaft being rotatable thereby along a shaft axis and having a slot extending longitudinally therealong from the distal end. The apparatus further comprises a spool guide located proximate to the distal end of the shaft adapted to retain a strap on the shaft and a strap guide extending parallel to and spaced apart from the shaft axis.

13 Claims, 13 Drawing Sheets

(56) References Cited

U.S. PATENT DOCUMENTS

| | | | | |
|---|---|---|---|---|
| 7,059,588 | B2* | 6/2006 | Goulet | B60P 7/0846 254/323 |
| D536,602 | S * | 2/2007 | Childress | D8/359 |
| 7,422,385 | B2* | 9/2008 | Koeda | B65H 18/10 101/228 |
| 7,497,398 | B2* | 3/2009 | Mehrer | B65B 13/025 100/9 |
| 7,766,271 | B1* | 8/2010 | Confoey | B60P 7/0846 24/68 CD |
| 8,272,820 | B2* | 9/2012 | Numata | B60P 7/083 410/100 |
| 9,016,614 | B1* | 4/2015 | Pouncil | A01K 89/003 242/566 |
| 9,616,801 | B2* | 4/2017 | Williams | B60P 7/0853 |
| 9,676,590 | B1* | 6/2017 | Berry | B65H 75/241 |
| 9,707,136 | B2* | 7/2017 | Broten | A61F 15/007 |
| 2004/0089761 | A1* | 5/2004 | Tsao | A62C 33/04 242/530.2 |
| 2007/0075177 | A1* | 4/2007 | Mehrer | B65B 13/025 242/533 |
| 2007/0114320 | A1* | 5/2007 | Johns | A61F 15/007 242/532.6 |
| 2007/0145179 | A1* | 6/2007 | Engelsher | A61F 15/007 242/532.6 |
| 2012/0145820 | A1* | 6/2012 | White | B60P 7/0846 242/532.6 |
| 2013/0101368 | A1* | 4/2013 | Booher | B60P 7/083 410/103 |
| 2014/0110520 | A1* | 4/2014 | Hampson | B60P 7/0846 242/395 |
| 2014/0166800 | A1* | 6/2014 | Hsieh | B65H 26/06 242/390.1 |
| 2016/0046228 | A1* | 2/2016 | Williams | B60P 7/0846 410/98 |

* cited by examiner

METHOD AND APPARATUS FOR WINDING STRAPS

CROSS REFERENCE TO RELATED APPLICATION

This application is a continuation in part application of U.S. patent application Ser. No. 14/796,926 filed Jul. 10, 2015 entitled Method and Apparatus for Winding Straps.

BACKGROUND OF THE INVENTION

1. Field of Invention

The present invention relates to transportation in general and in particular to a method and apparatus for winding straps.

2. Description of Related Art

In the field of transportation, articles to be transported are frequently located upon flat deck trailers or trucks and secured thereto. One common method of securing such articles to a vehicle is to utilize cargo straps or other flexible tensile members which may be extended over the article and thereafter fastened to the deck. Such straps are commonly formed of nylon, polyester or the like.

One difficulty experienced with the use of such straps is the need to keep such cargo scraps neat and organized in between uses. One common method of maintaining the organization of cargo straps is to roll them into cylindrical or just shapes for compact storage and transportation. However, rolling such straps by hand is a time consuming and difficult task to complete.

Previous attempts have been made to automate the rolling of cargo straps, however such attempts have had drawbacks. In particular, motorized shafts have been provided which may be utilized to wind the straps thereon. Disadvantageously, such devices have required considerable user input to ensure the strap remains straight during any rolling operation and pose safety concerns while the user stands close to the device, guiding the strap.

Additionally, the heavy metal end (D-ring or J-hook) can pose a danger if it is over thrown when it reaches the rotating roll. An example of such devices may be found in US patent application publication number US2012/0145820 to White.

SUMMARY OF THE INVENTION

According to a further embodiment of the present invention there is disclosed an apparatus for winding straps comprising a motor having a shaft extending therefrom to a distal end, the shaft being rotatable thereby along a shaft axis and having a slot extending longitudinally therealong from the distal end. The apparatus further comprises a spool guide located proximate to the distal end of the shaft adapted to retain a strap on the shaft and a strap guide extending parallel to and spaced apart from the shaft axis.

The strap guide may be located at the end of a strap guide arm extending perpendicular to the shaft axis. The strap guide arm may be rotatable about the shaft axis between a first position substantially horizontally extending from the shaft and a second position past vertically above the shaft. The apparatus may further comprise a limit stop switch adapted to stop the motor when the strap guide arm is at the second position. The strap guide arm may be rotatably secured to a location proximate to the motor. The strap guide arm may be radially lengthenable.

The strap guide may include a slot extending parallel to the shaft axis. The slot may be formed between front and rear members. The rear member may include an extended tapered edge extending downwardly therefrom. The rear member may include a roller on the rear surface thereof.

The spool guide may comprise a spool guide arm rotatable about an axis parallel to the shaft axis. The spool guide arm may include an extendable distal end portion. The spool guide arm may include a magnet at the distal end portion adapted to engage upon the strap guide. The spool guide arm may include a rotation limit stop adapted to prevent rotation of the spool guide arm above horizontal.

The apparatus may further comprise an adjustable guide arm extending proximate to the shaft so as to position the strap between the adjustable guide arm and the spool guide.

According to a further embodiment of the present invention there is disclosed a method for winding straps comprising passing a free end of a strap through a slot in a shaft extending from a motor, the shaft being rotatable thereby along a shaft axis. The method further comprises passing the strap through a strap guide extending parallel to and spaced apart from the shaft axis and rotating the shaft so as to wind the strap thereabout until a distal end of the strap engages upon the strap guide thereby rotating the strap guide upwardly about the shaft and disengaging a magnetic end of a spool guide located proximate to the distal end of the shaft so as to permit the spool guide to rotate downward permitting removal of the strap from the shaft.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention wherein similar characters of reference denote corresponding parts in each view.

DETAILED DESCRIPTION

Figure 1:
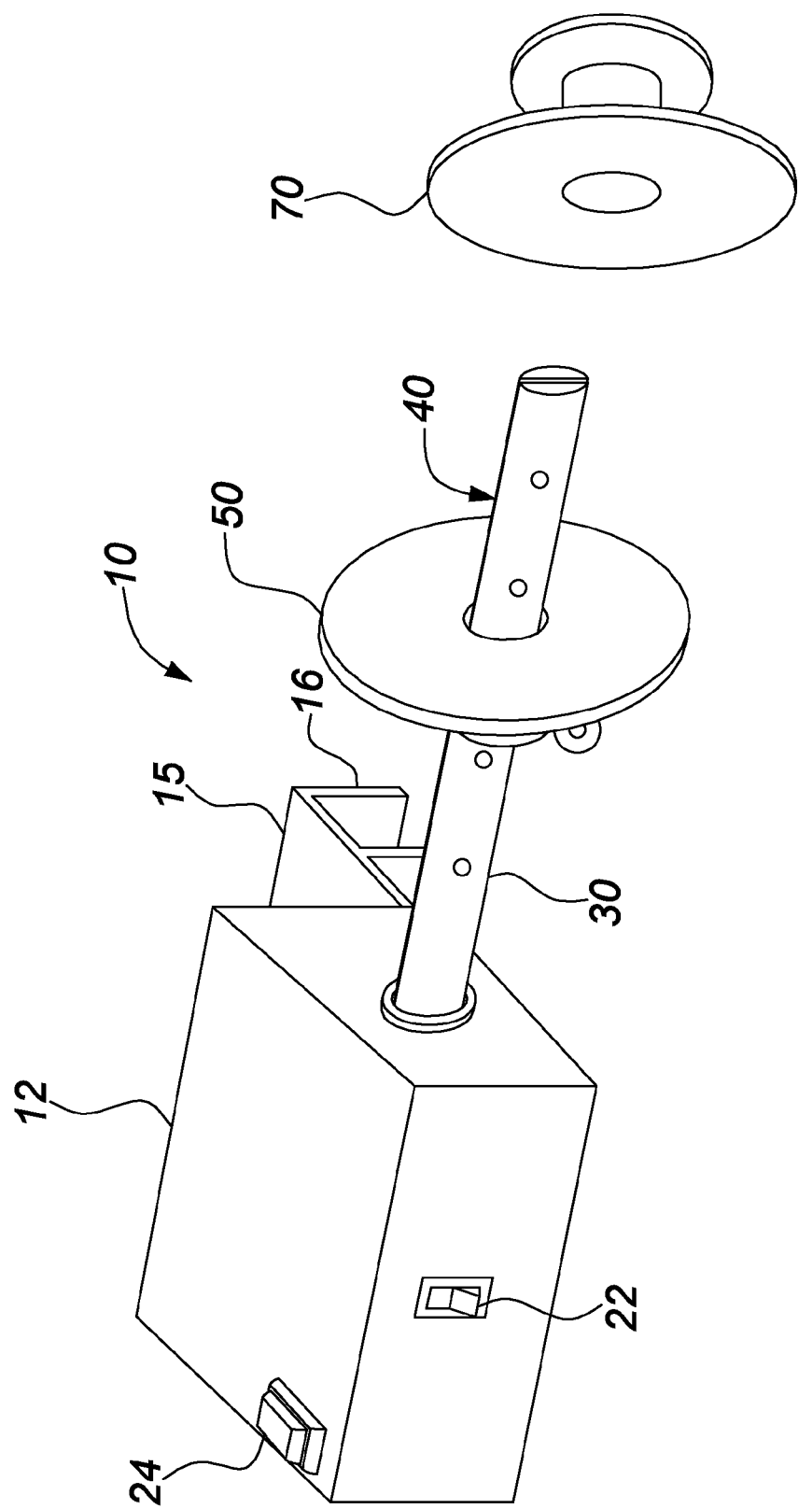
FIG. 1 is a perspective view of an apparatus for winding straps mounted to a trailer according to a first embodiment of the present invention.
Figure 5:
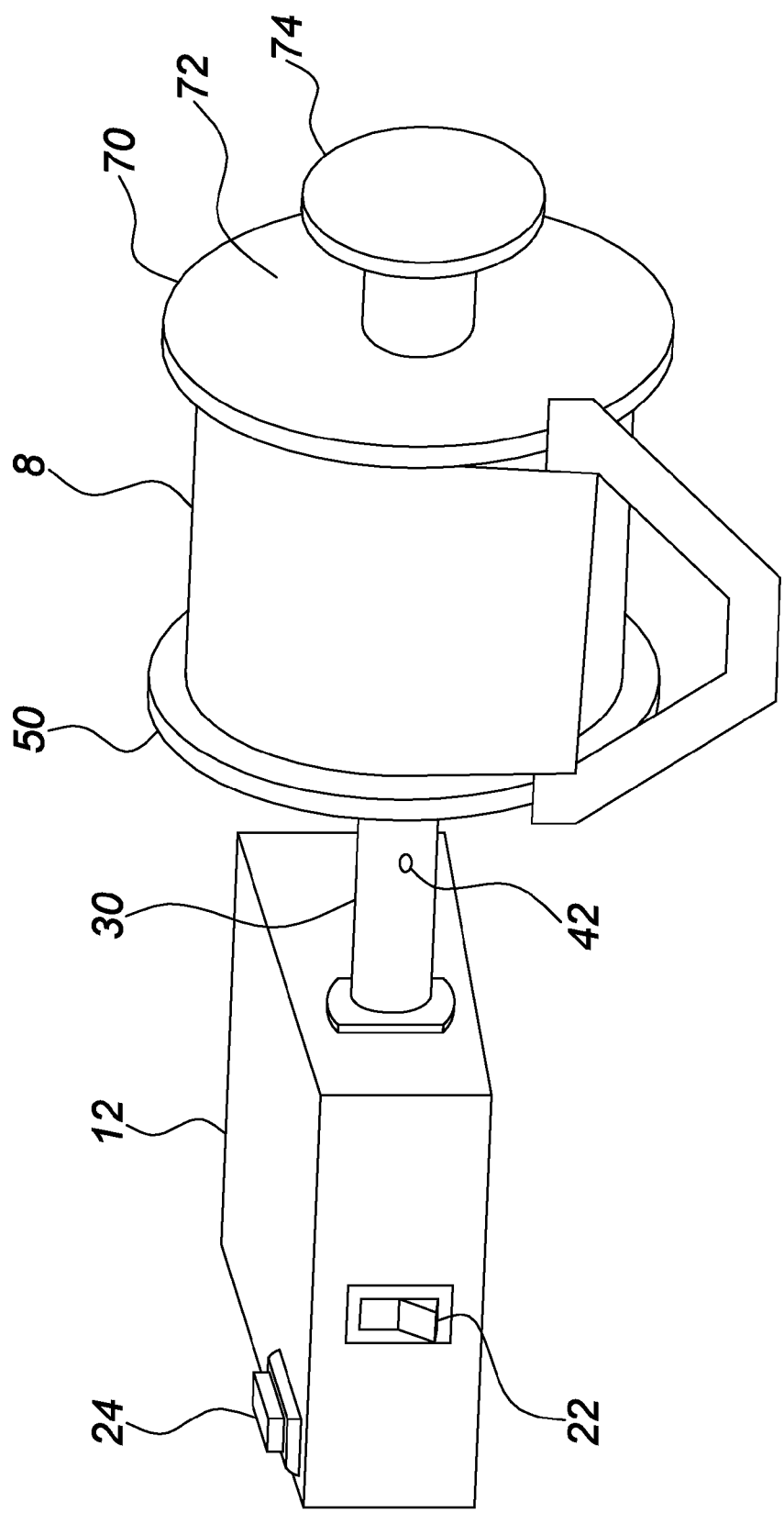
FIG. 5 is a perspective view of the apparatus of FIG. 1 with a strap wound therearound.

Referring to FIGS. 1 and 5, an apparatus for winding a strap 8 into a roll according to a first embodiment of the invention is shown generally at 10. The apparatus comprises a motor 12 securable to a vehicle 6 (not shown). The motor 12 rotates a shaft 30 having a guide flange 50 and a guide cap 70 thereon between which the strap is wound, as will be more fully described below.

Figure 2:
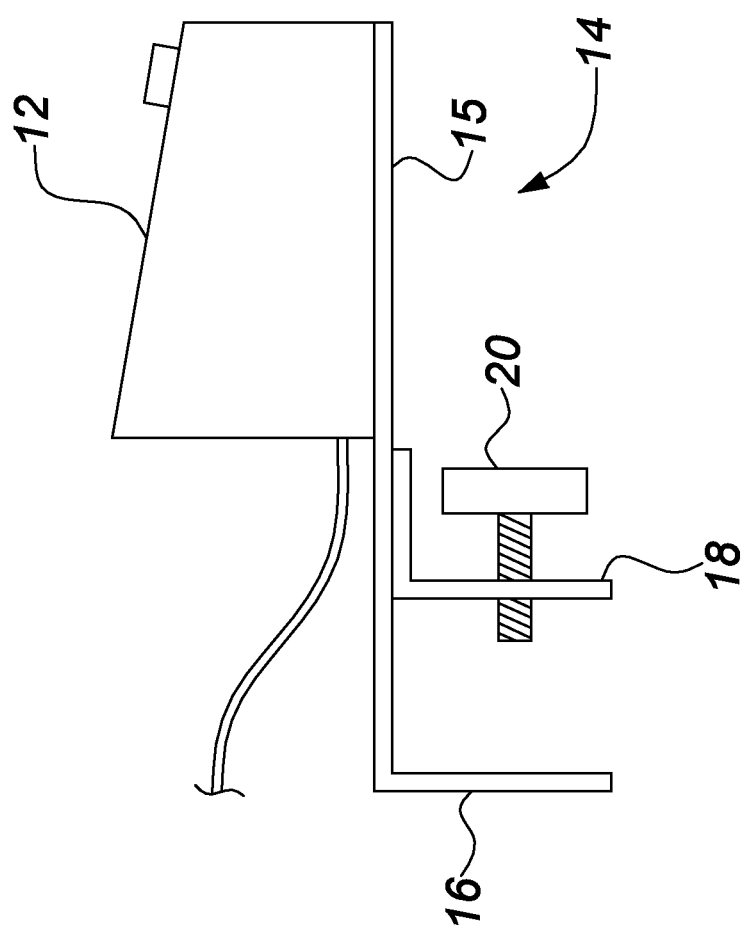
FIG. 2 is a side view of the apparatus of FIG. 1.

The motor 12 may be of any conventional type, such as by way of non-limiting example, electric, pneumatic or hydraulic. It will be appreciated that the motor 12 may be powered by a power source located on the vehicle through a power cable or may optionally include a battery (not shown) which may be recharged as required by any conventional means. As illustrated in FIG. 2, the motor includes a mounting assembly, generally indicated at 14 for securing the apparatus to a vehicle 6. In particular, the mounting assembly may comprise a plate 15 to which the motor 12 is secured using any known means, such as, by way of non-limiting example, fasteners, welding, adhesives or the like. The mounting assembly 14 includes an end backing plate 16 and a parallel spaced apart clamping plate 18 extending downwardly therefrom. The clamping plate 18 includes a threaded member 20 extending therethrough adapted to be turned within the clamping plate 18 so as to clamp a portion of the vehicle between the threaded member and the backing plate 16 thereby securing the pate 15 and motor 12 to a vehicle. It will be appreciated that the motor may be contained within a casing as illustrated in FIG. 1. The motor may also have an associated power switch 22 and/or activation button 24. In operation, the power switch may enable operation wherein the activation button may cause the motor shaft to rotate.

Figure 3:
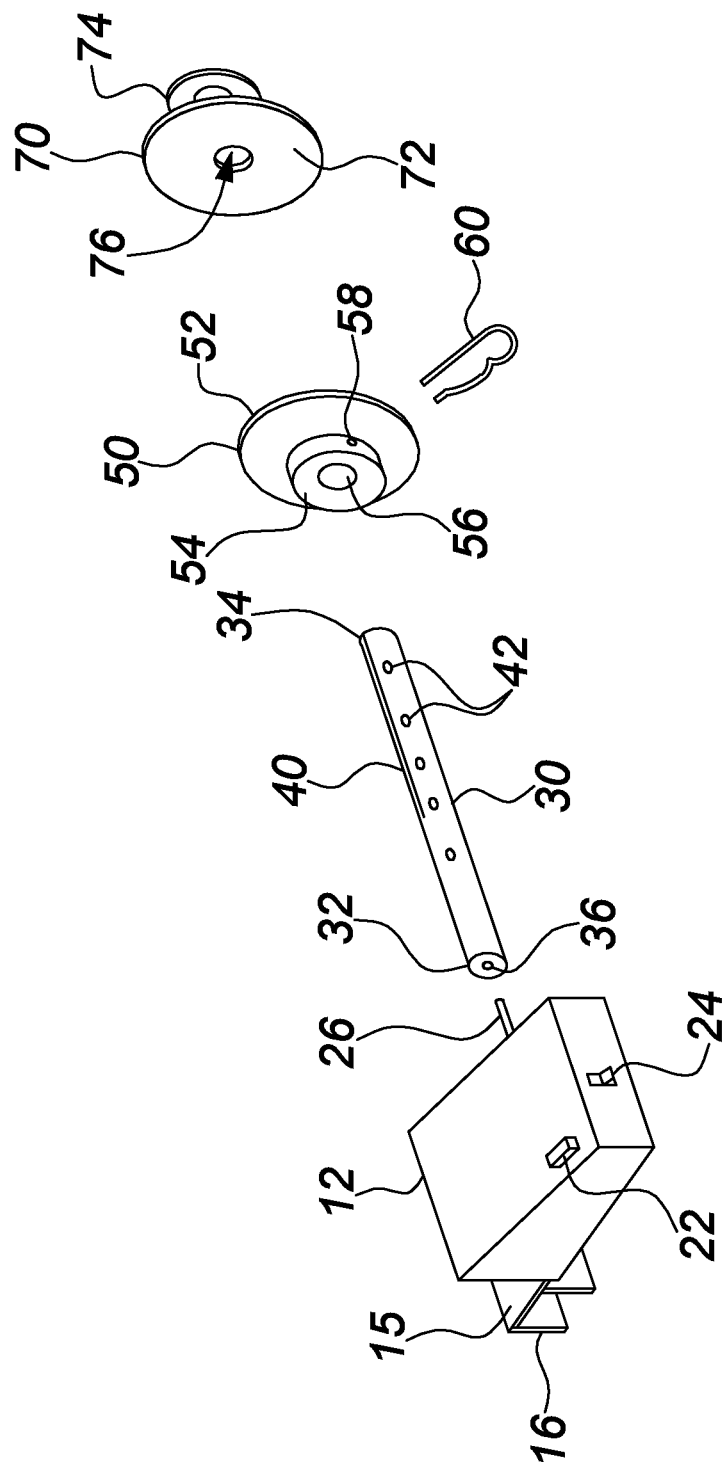
FIG. 3 is an exploded view of the apparatus of FIG. 1.

Turning now to FIG. 3, the apparatus 10 includes a shaft 30 extending from the motor 12 which is adapted to be turned by the motor. It will be appreciated that the shaft 30 may be secured directly to or co-formed with the motor shaft (not shown) or may be connected thereto and rotated thereby through a gear or other drive assembly. The shaft 30 extends between proximate and distal ends, 32 and 34, respectively wherein the proximate end 32 may include a bore 36 for securing to an output shaft 26 from the motor 12. The bore 36 may be secured over the output shaft 26 through any conventional means, such a threading, fasteners, adhesives, welding or the like. The shaft 30 includes a slot 40 extending along a portion of the length thereof from the distal end 34. The slot 40 has a width corresponding to the thickness of a strap to be wound, such as, by way of non-limiting example, between ⅛ and ⅜ inches (3 and 10 mm). The slot 40 has a length adapted to extend along the shaft 30 a sufficient length to permit a range of straps to be inserted therein, such as up to 80 percent of a shaft, although it will be appreciated that greater percentages may be utilized provided the shaft retains sufficient strength. The shaft 30 further includes a plurality of transverse bores 42 extending therethrough. As illustrated in FIG. 3, the transverse bores 42 extend transversely to the slot 40 so as to pass therethrough. The transverse bores 42 are located at locations along the shaft 30 selected to receive and retain a strap between the guide flange 50 and the guide cap 70 as will be more fully described below. The shaft 30 may be formed of a magnetic material or may optionally have magnets embedded therein so as to retain the guide cap thereon as will be more fully described below.

Figure 6:
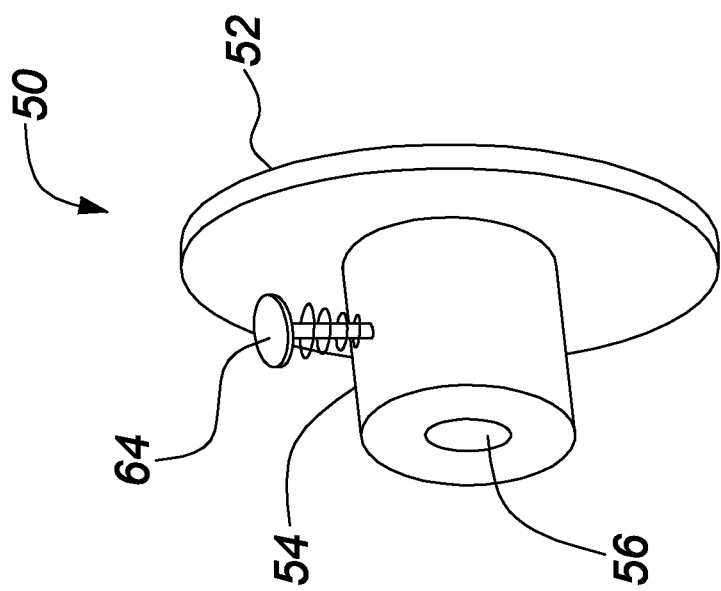
FIG. 6 is a perspective view of a guide flange according to a further embodiment of the present invention.

The guide flange 50 comprises a body having a flange portion 52 and a collar portion 54 extending therefrom. The flange and collar portions each include a bore 56 therethrough sized to correspond to the shaft 30. The collar portion 54 includes a locating bore 58 therethrough sized to receive a pin 60 or other fasteners therethrough. In operation, the pin 60 may be passed through the locating bore 58 and an aligned transverse bore 42 in the shaft to fix the location of the guide flange 50 upon the shaft 30. Alternatively, it will be appreciated that other means for locating the guide flange at a desired location may also be utilized such as indentations, spring loaded pins 64 or the like, as illustrated in FIG. 6.

Figure 4:
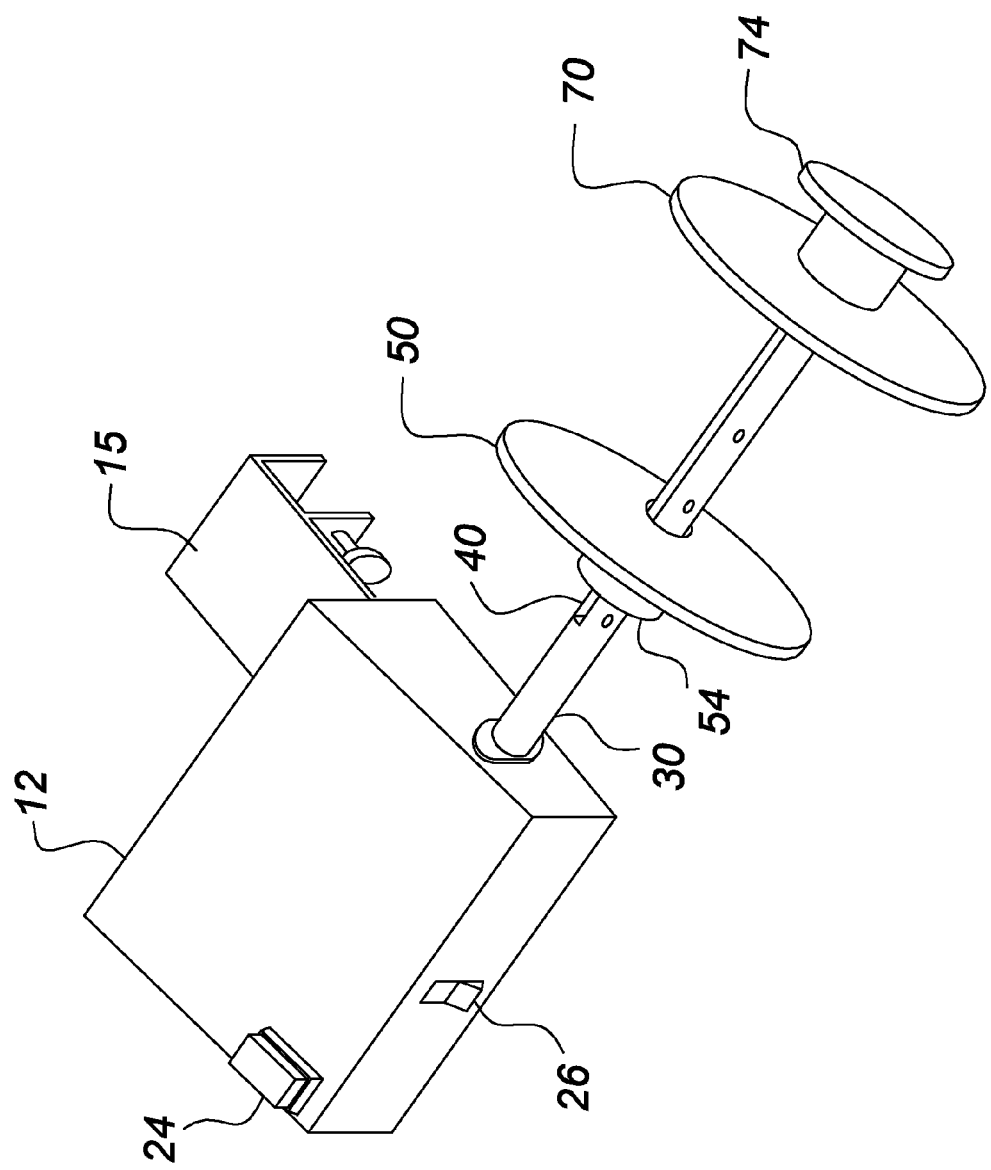
FIG. 4 is a perspective view of the apparatus of FIG. 1 with the guide flange positioned to receive a strap.

The guide cap 70 comprises a body having a flange portion 72 and a collar portion 74 extending therefrom. The flange and collar portions include a blind bore 76 which does not extend completely through the collar portion 74 as illustrated in FIGS. 4 and 5. The guide cap 70 is formed of a ferromagnetic material or may optionally include magnets embedded therein so as to be drawn towards the shaft 30 such that the distal end 34 of the shaft is drawn into and located within the blind bore 76. Optionally, the blind bore 76 of the guide cap 70 may include alternative means for retaining the guide cap 76 upon the distal end 34 of the shaft 30, such as, by way of non-limiting example, snap rings, annular ridges, friction fit, spring loaded rollers or the like as are commonly known.

In operation, the guide flange 50 may be located along the shaft at a location corresponding to the width of the strap to be wound and a pin 60 passed through the locating bore 58 and transverse bore 42 to fix the position thereof. Thereafter, blind bore 76 of the guide cap 70 may be located upon the distal end 34 of the shaft 30 such that the distal end 34 is retained therein by the magnets. A free end of the strap 8 may then be passed through the slot 40 between the guide flange 50 and the guide cap 70 and the motor engaged by the activation button 24 to rotate the shaft 30 thereby winding the strap 8 about the shaft 30 to a wound position as illustrated in FIG. 5. Thereafter, the guide cap 70 may be removed from the shaft 30 and the wound strap 8 slidably removed from the end of the shaft quickly and neatly.

Figure 7:
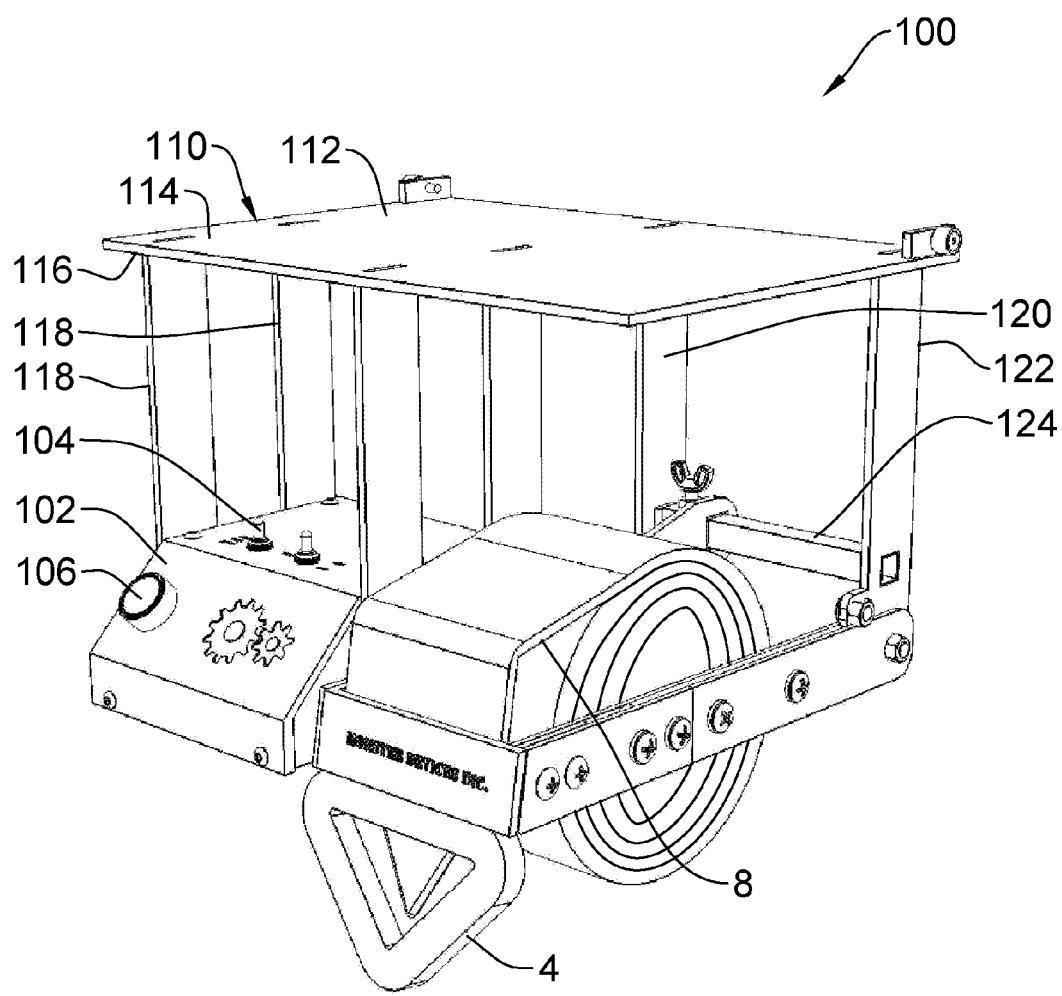
FIG. 7 is a perspective view of an apparatus for winding straps according to a further embodiment of the present invention with a strap wound therearound.
Figure 8:
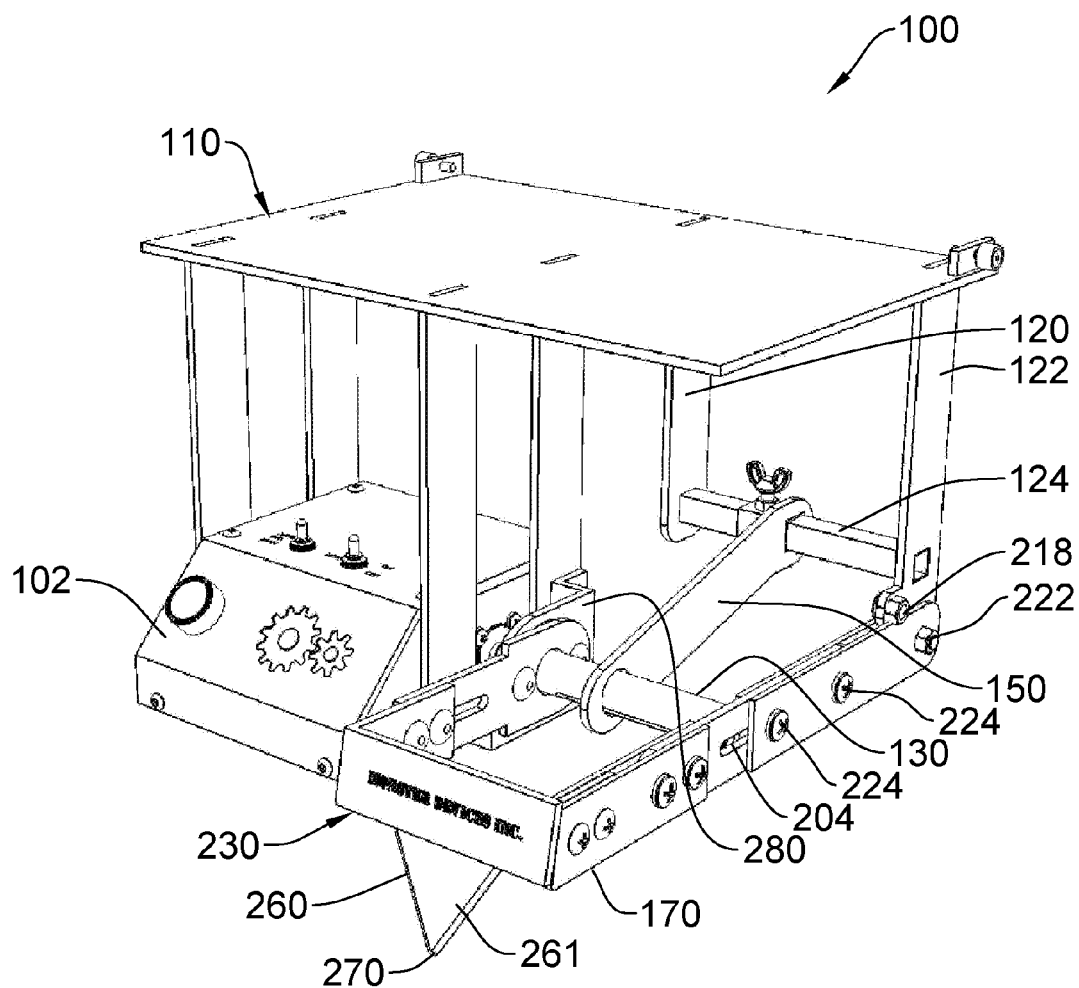
FIG. 8 is a perspective view of the apparatus of FIG. 7 in a second, extended position, with the strap guide adjusted.

Now turning to FIGS. 7 and 8, an apparatus for winding a strap 8 into a roll according to a further embodiment of the invention is shown generally at 100. The apparatus comprises a motor 102 secured to a frame assembly 110 securable to a vehicle 6. The motor 102 rotates a shaft 130 extending through a strap guide assembly 230 and an adjustable guide arm 150, with an extendable spool guide swing arm 170 proximate to the distal end thereof, between which the strap 8, having a hook or ring 4 at the distal end thereof, is wound, as will be more fully described below.

The frame assembly 110 includes a top plate 112, having top and bottom surfaces 114 and 116, respectively, securable to a vehicle 6 proximate to the top surface 114 by any known means, and a plurality of support hangers 118 attached transversely therefrom the bottom surface 116 by any known means, to which the motor 102 is secured. First and second guide rod support arms, 120 and 122, respectively, extend transversely from the bottom surface 116, with a guide rod 124 extending therebetween, the purpose of which will be set out in more detail below.

The motor 102 may be of any conventional type, such as by way of non-limiting example, electric, pneumatic or hydraulic. It will be appreciated that the motor 102 may be powered by a power source located on the vehicle through a power cable (not shown) or may optionally include a battery (not shown) which may be recharged as required by any conventional means. As set out above, the motor 102 may be mounted to or supported by the frame assembly 110. In particular, the frame assembly 110 may comprise a plurality of support hangers 118 to which the motor 102 is secured using any known means, such as, by way of non-limiting example, fasteners, welding, adhesives or the like.

It will be appreciated that the motor 102 may be contained within a casing as illustrated in FIGS. 7 and 8. The motor may also have an associated power switch 104 and/or activation button 106. In operation, the power switch 104 may enable operation wherein the activation button 106 may cause the motor shaft to rotate. The power switch 104 may have an automatic option, such that the motor shaft will rotate with a push and release of the activation button 106, and/or it may have a manual option, such that the motor shaft will rotate only when the activation button 106 is held down continuously.

Figure 9:
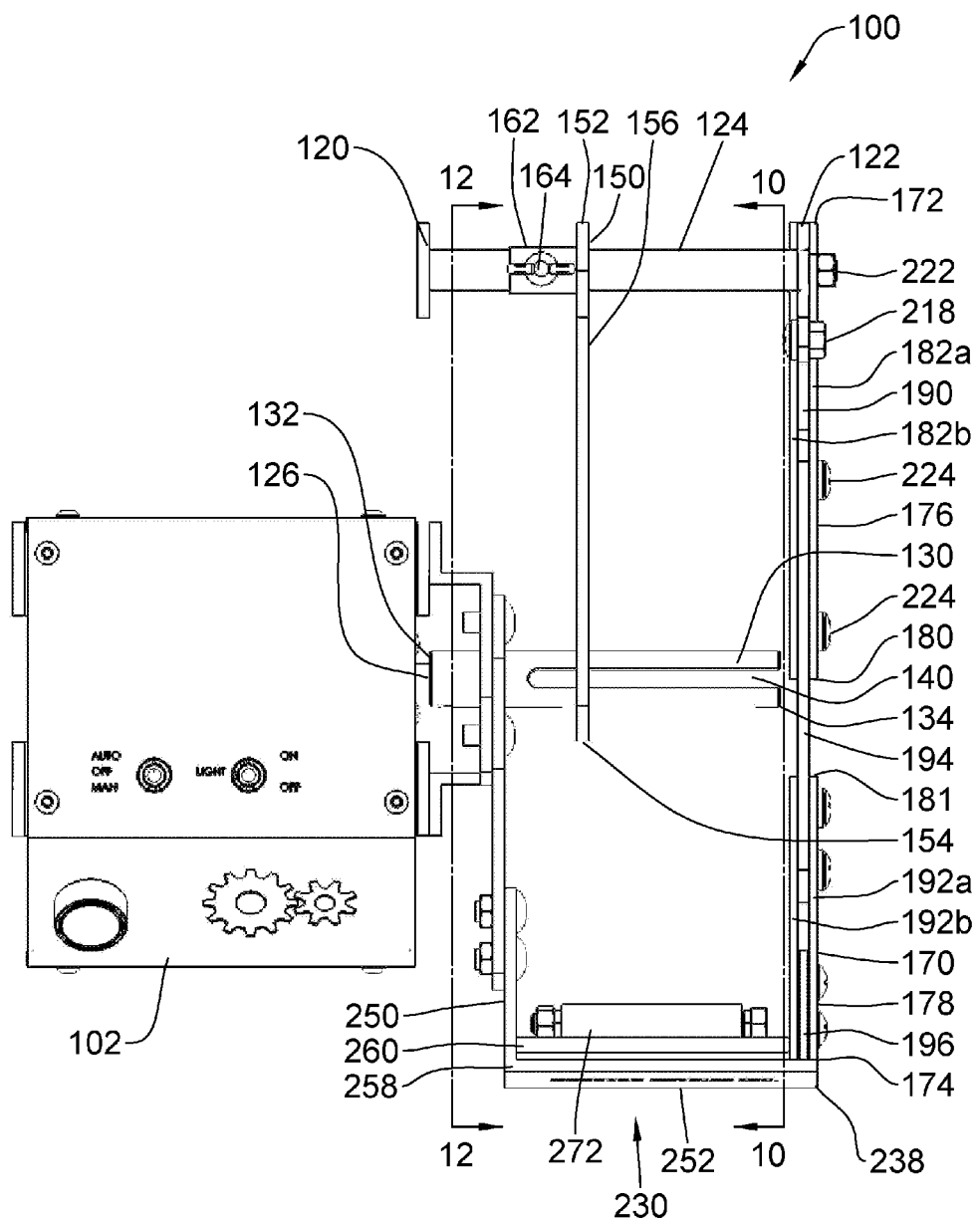
FIG. 9 is a top view of the apparatus of FIG. 7.
Figure 13:
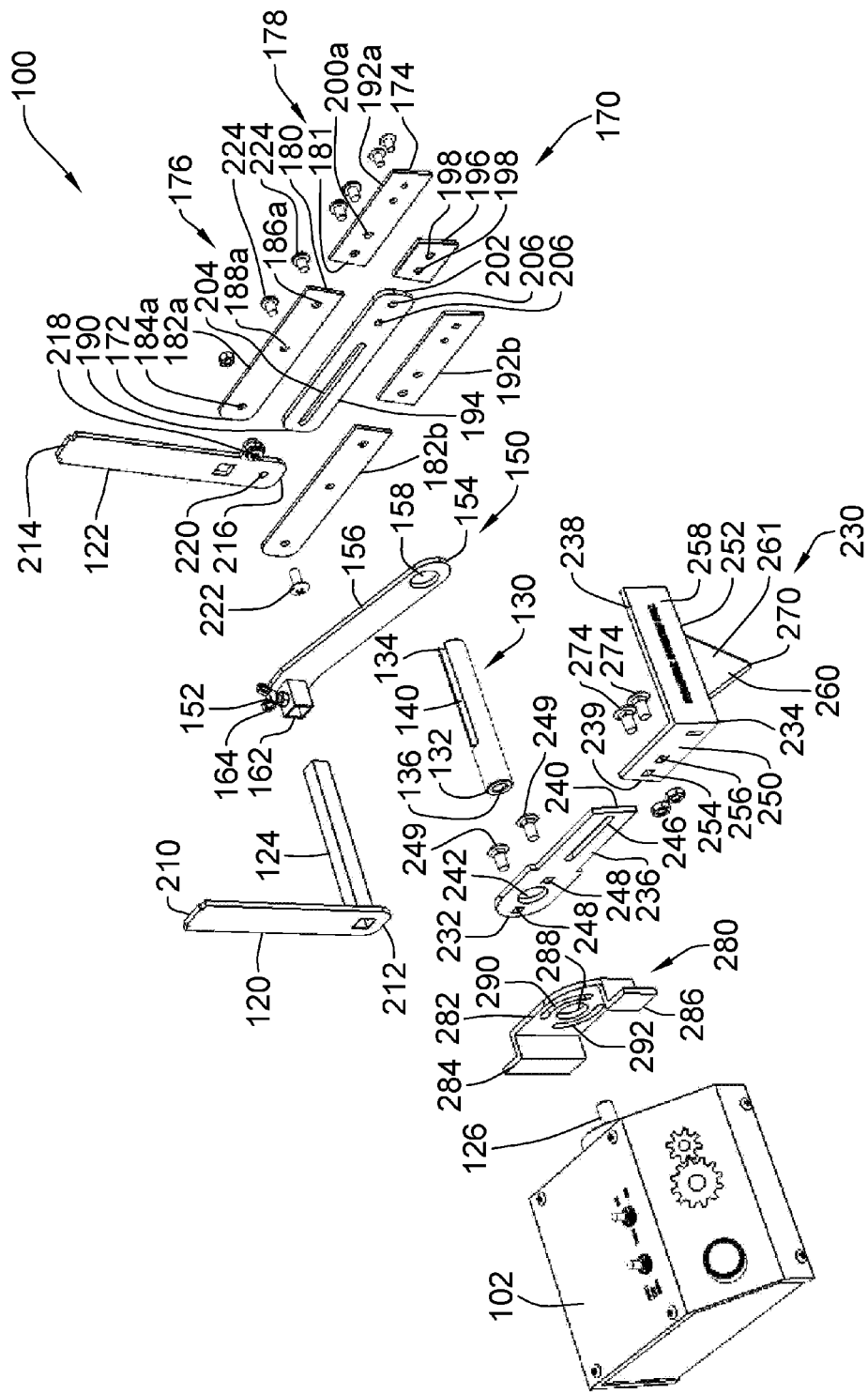
FIG. 13 is an exploded view of the apparatus of FIG. 7.

Referring to FIGS. 9 and 13, the apparatus 100 includes a shaft 130 extending from the motor 102 which is adapted to be turned by the motor. It will be appreciated that the shaft 130 may be secured directly to or co-formed with the motor shaft (not shown) or may be connected thereto and rotated thereby through a gear or other drive assembly. The shaft 130 extends between proximate and distal ends, 132 and 134, respectively wherein the proximate end 132 may include a bore 136 for securing to an output shaft 126 from the motor 102. The bore 136 may be secured over the output shaft 126 through any conventional means, such a threading, fasteners, adhesives, welding or the like. The shaft 130 includes a slot 140 extending along a portion of the length thereof from the distal end 134. The slot 140 has a width corresponding to the thickness of a strap to be wound, such as, by way of non-limiting example, between ⅛ and ⅜ inches (3 and 10 mm). The slot 140 has a length adapted to extend along the shaft 130 a sufficient length to permit a range of straps to be inserted therein, such as up to 80 percent of a shaft, although it will be appreciated that greater percentages may be utilized provided the shaft retains sufficient strength.

Referring to FIGS. 8 and 13, the first and second guide rod support arms, 120 and 122, respectively, extend transversely from the bottom surface 116 of the frame assembly 110, with a guide rod 124 extending therebetween, as set out above. The first guide rod support arm 120 extends between a first end 210 proximate to the bottom surface 116 of the top plate 112 and a second end 212. The second guide rod support arm 122 extends between a first end 214 proximate to the bottom surface 116 of the top plate 112 and a second end 216.

The second guide rod support arm 122 includes a rotation limit stop 218 extending therefrom proximate to the second end 216, the purpose of which will be set out below. A transverse hinge bore 220 extends therethrough the second guide rod support arm 122 proximate to the second end 216. The guide rod 124 extends between the first and second guide rod support arms, 120 and 122, proximate to the second ends, 212 and 216, as will be more fully described below.

Referring to FIGS. 8, 9 and 13, the apparatus 100 includes a strap guide assembly 230 extending between first and second ends, 232 and 234, respectively, comprised of a base portion 236 and an extendable portion 238. The base portion 236 extends between the first and a second ends 232 and 240, respectively, and includes a circular shaft bore 242 proximate to the first end, adapted to allow the shaft 130 to pass therethrough, and a slot 246 extending along a portion of the length thereof from proximate to the second end 240. A plurality of transverse slot pin bores 248 are positioned therearound the circular shaft bore 242, sized to receive a plurality of slot pins 249.

Figure 10:
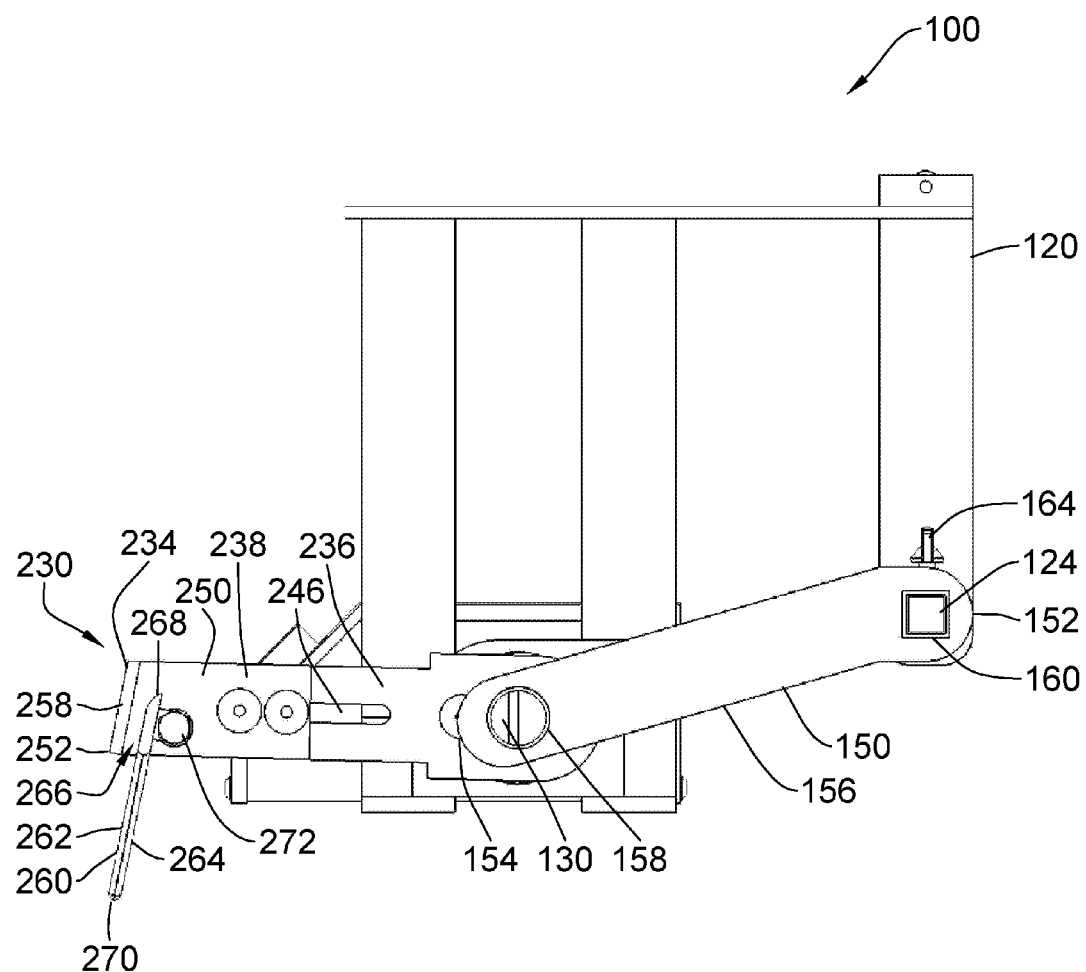
FIG. 10 is a side cross sectional view of the apparatus of FIG. 7, taken along the section lines 10-10.

The extendable portion 238 extends between a first end 239 and the second end 234 and is comprised of a side plate 250 and a front assembly 252. The side plate 250 extends between the first and second ends, 239 and 234, respectively, and includes first and second slot pin bores, 254 and 256, respectively, therealong spaced apart less than the length of the slot 246 of the base portion 236. Referring now to FIG. 10, the front assembly 252 includes a front plate 258 extending transversely from the side plate 250 at the second end 234, with a rear plate 260, having first and second surfaces, 262 and 264, respectively, extending transversely from the side plate 250, spaced apart from the front plate 258 to form a gap 266 therebetween. The gap 266 distance may be in the range of such as, by way of non-limiting example, ⅛ to ½ inches (3 to 13mm) to permit a strap 8 to pass therethrough. The rear plate 260 extends between top and bottom edges, 268 and 270, respectively. As best seen in FIG. 9, the rear plate 260 extends between the side plate 250 and the extendable spool guide swing arm 170 at the top edge 268. As best seen in FIGS. 8 and 13, the rear plate 260 includes a tongue portion 261 tapering to a point at the bottom edge 270. It will be appreciated that it may be useful to form the tongue portion 261 in other shapes, as well. As best seen in FIG. 9, a roller assembly 272, as is commonly known, extends from the second surface 264 of the rear plate 260, the purpose of which will set out in more detail below.

The strap guide assembly 230 may be assembled with the base portion 236 aligned with the extendable portion 238 such that the first and second slot pin bores, 254 and 256, may be aligned with the slot 246, with slot pins 274 therethrough. The slot pins 274 may be such as, by way of non-limiting example, bolts, screws, rivets or the like. As the slot pins 274 are spaced apart a distance less than the length of the slot 246, as set out above, the strap guide assembly 230 may extend from a first position, as best seen in FIG. 7, to a fully extended position, as best seen in FIG. 8, with the extending portion permitting slidable movement along the slot 246. The purpose of the extendable feature will be set out below. It will be appreciated that other slide types may be possible, as well.

Figure 12:
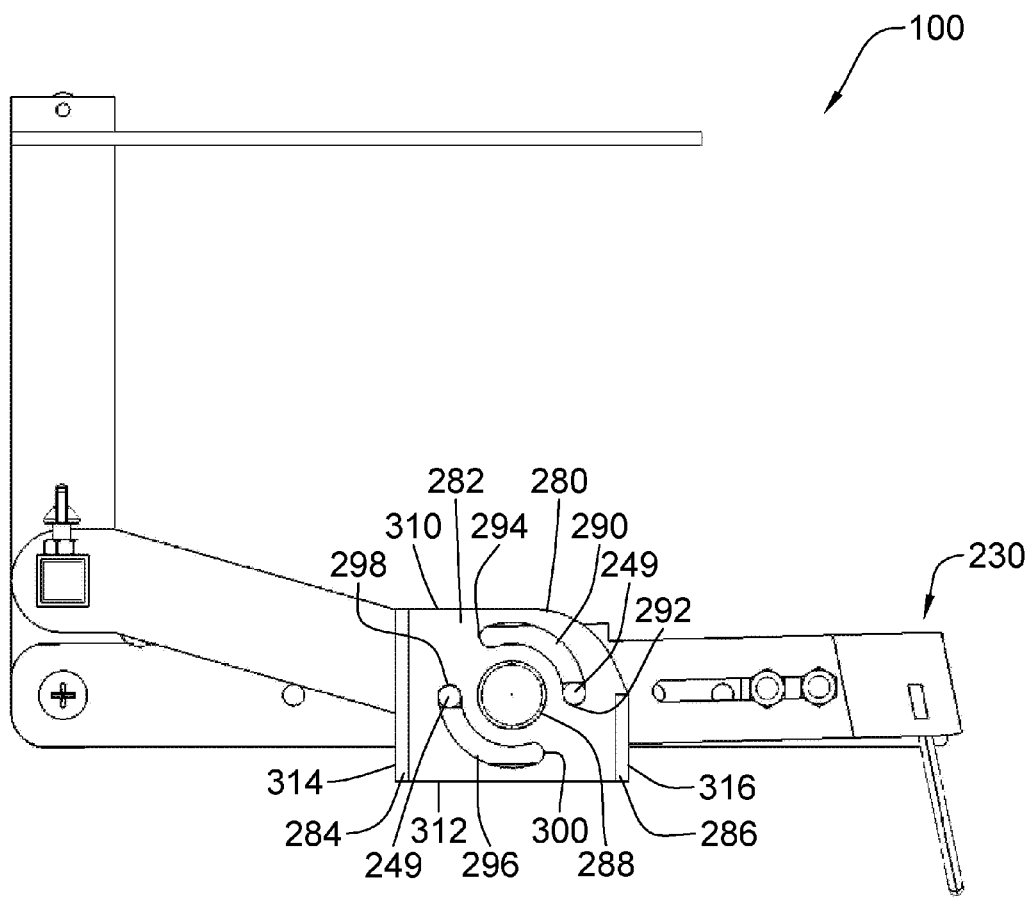
FIG. 12 is a partial cross sectional view of the apparatus of FIG. 7, as taken along the section lines 12-12.

Referring to FIGS. 8, 9, 12 and 13, the strap guide assembly 230 may be mounted to a strap guide bracket 280, as will be described in more detail below. The strap guide bracket 280 comprises a front plate 282, extending between top and bottom edges, 310 and 312, respectively, and first and second sides 314 and 316, respectively, with parallel, spaced apart first and second mounting plates, 284 and 286, respectively, extending transversely therefrom at the first and second sides, 314 and 316. The first and second mounting plates, 284 and 286, may be secured to the frame assembly 110 using any known means, such as, by way of non-limiting example, fasteners, welding, adhesives or the like. Referring to FIGS. 12 and 13, the front plate 282 includes a circular shaft bore 288, adapted to allow the shaft 130 to pass therethrough, with first and second arc slots 290 and 296, respectively, distributed therearound, sized to receive the slot pins 249. The first arc slot 290 extends between first and second stops, 292 and 294, respectively, such that the first stop 292 may be horizontally aligned with the circular shaft bore 288, proximate to the second side 316 and the first arc slot 290 may extend to the second stop 294 through a rotational angle of such as, by way of non-limiting example, 95 to 100 degrees, with the second stop 294 proximate to the top edge 310. The second arc slot 296 extends between first and second stops, 298 and 300, respectively, such that the first stop 298 may be horizontally aligned with the circular shaft bore 288, proximate to the first side 314 and the second arc slot 296 may extend to the second stop 300 through a rotational angle of such as, by way of non-limiting example, 95 to 100 degrees, with the second stop 300 proximate to the bottom edge 312. The first and second arc slots 290 and 296.

Figure 11:
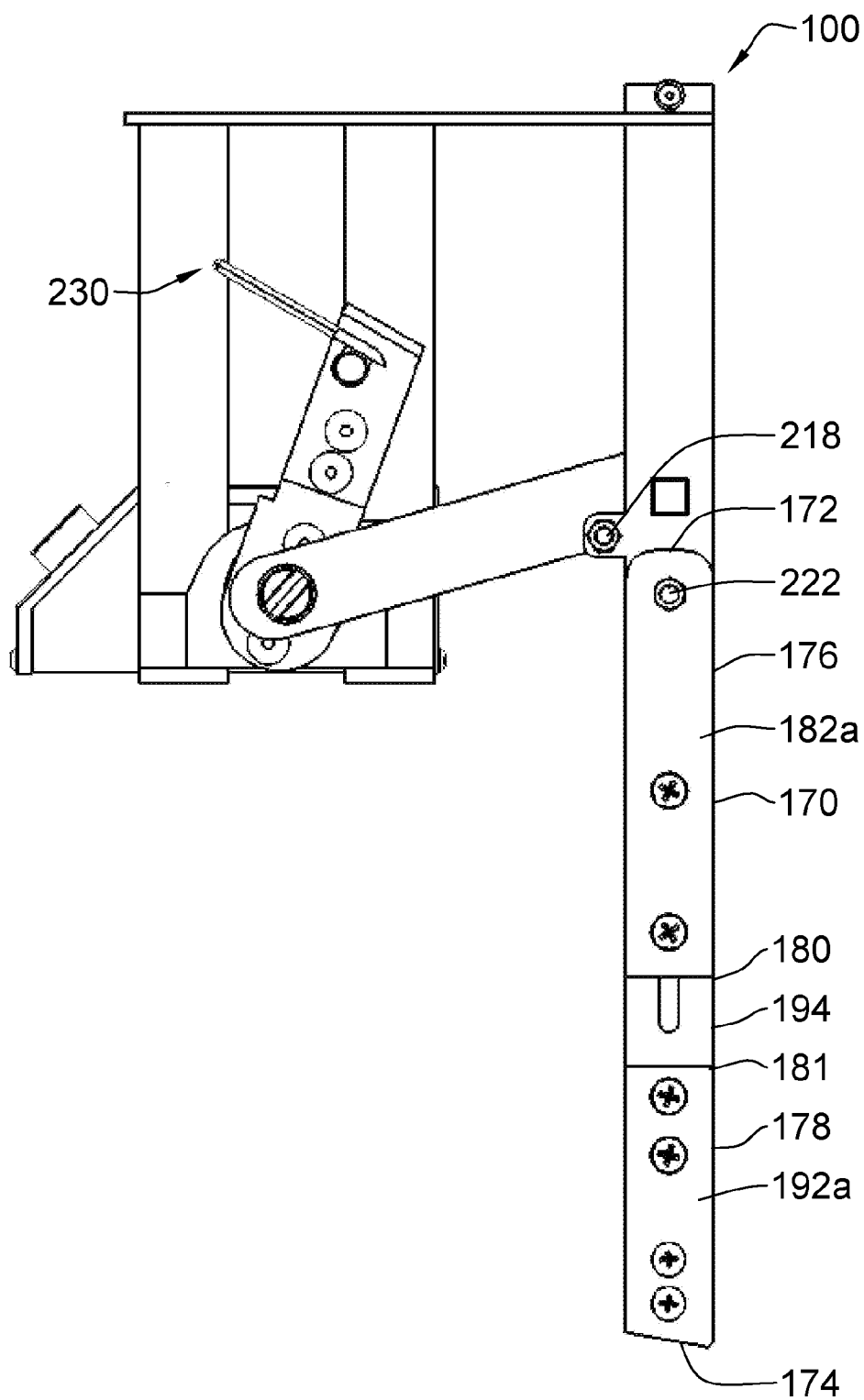
FIG. 11 is a side view of the apparatus of FIG. 7, in a second position, with the fairlead arm rotated upwards and the guide arm rotated downwards.

As best seen in FIG. 8, the strap guide bracket 280 may be secured to the frame assembly 110 as set out above, with the shaft 130 passing therethrough the circular shaft bore 288. The strap guide assembly 230 may be aligned with the strap guide bracket 280, with the shaft 130 passing therethrough the circular shaft bore 242, and the transverse slot pin bores 248 aligned with the first and second arc slots, with the slot pins 249 therethrough. The strap guide assembly 230 may rotate between a first position, as shown in FIG. 8, with the slot pins 249 aligned at the first stops 292 and 298, and a second position, as shown in FIG. 11, with the slot pins 249 aligned at the second stops 294 and 300. When the slot pins 249 are aligned in the first and second arc slots 290 and 296 at the second stops 294 and 300, a limit switch (not shown) may disengage the motor 12 such that it ceases operation.

Referring now to FIGS. 9, 11 and 13, the extendable spool guide swing arm 170 extends between first and second ends, 172 and 174, respectively, and is comprised of a swingable portion 176 extending from the first end 172, and an extending portion 178 extending from the second end 174. The extending portion 178 extends between a first end 190 and second end 174, and is comprised of first and second plates 192a and 192b, respectively, with a sliding plate 194 and a magnetic plate 196 therebetween. Each of the first and second plates, 192a and 192b, are formed the same, extending between a first end 181 and the second end 174, with a plurality of transverse bores 200a and 200b, extending therethrough. The magnetic plate 196 is selected to be of a shorter length than the first and second plates 192a, 192b and includes a plurality of transverse bores 198 extending therethrough, located therealong and selected to be aligned with a portion of the transverse bores 200a, 200b of the first and second plates 192a, 192b proximate to the second end 174. The magnetic plate 196 may be formed of a magnetic material or may optionally have magnets imbedded therein proximate to the second end 174 so as to engage upon the strap guide assembly 230 as will be more fully described below. The sliding plate 194 extends between the first end 190 and a second end 202 and includes a slot 204 extending along a portion of the length thereof from proximate to the first end 190, and a plurality of transverse bores 206 extending therethrough, located therealong proximate to the second end 202. The transverse bores 206 are selected to be aligned with a portion of the transverse bores 200a, 200b of the first and second plates 192a, 192b proximate to the first end 181. The extending portion 178 may be assembled with bolts, screws, rivets or the like therethrough the aligned transverse bores, as is commonly known, such that the portion of the sliding plate 194 with the slot 204 extends from the first end 181 of the first and second plates 192a, 192b, as seen in FIGS. 8 and 11. Although the extending portion 178 is illustrated in the present embodiment of the invention with both first and second plates 192a, 192b, it will be appreciated that the extending portion 178 could be fabricated with one plate 192, or the magnetic plate 196 could be conformed with the sliding plate 194, without the plates 192a or 192b.

The swingable portion 176 of the extendable spool guide swing arm 170 extends between the first end 172 and a second end 180, and is comprised of first and second plates 182a and 182b, respectively. Each plate, 182a and 182b, is formed the same, with transverse hinge bores 184a and 184b extending therethrough proximate to the first end 172, transverse end bores 186a and 186b extending therethrough proximate to the second end 180, and transverse mid bores 188a and 188b extending therethrough therebetween. The transverse hinge bores 184a, 184b are selected to be aligned with the transverse hinge bore 220 of the second guide rod support arm 122. The transverse mid bores 188a, 188b are positioned a distance apart from the transverse end bores 186a, 186b that is less than the length of the slot 204 of the extending portion 178. The extendable spool guide swing arm 170 may be assembled with the second guide rod support arm 122 and the sliding plate 194 aligned between the first and second plates 182a, 182b such that the transverse hinge bores 184a, 220 and 184b are aligned, with a pivot pin 222 therethrough, and the transverse mid and end bores 188a, 188b and 186a, 186b are aligned with the slot 204, with slot pins 224 therethrough. The pivot pin 222 and slot pins 224 may be such as, by way of non-limiting example, bolts, screws, rivets or the like. Although the swingable portion 176 is illustrated in the present embodiment of the invention with both first and second plates 182a and 182b, it will be appreciated that the swingable portion 176 could be fabricated with one plate 182.

When assembled, the extendable spool guide swing arm 170 may pivot about the pivot pin 222 through the hinge bores 184a, 220 and 184b, permitting the extendable spool guide swing arm 170 to rotate between a lowered position, as best seen in FIG. 11, and a raised position, as best seen in FIG. 8. The rotation limit stop 218 prevents the extendable spool guide swing arm 170 from pivoting upwards beyond the raised position shown in FIG. 8. The magnetic plate 196 engages upon the strap guide assembly 230 in the raised position, retaining the extendable spool guide swing arm 170 thereon. As the slot pins 224 are spaced apart a distance less than the length of the slot 204, as set out above, the extendable spool guide swing arm 170 may extend from a first position, as best seen in FIG. 7, to a fully extended position, as best seen in FIG. 8, with the extending portion permitting slidable movement along the slot 204 to maintain the magnetic plate 196 in contact upon the strap guide assembly 230.

Referring to FIGS. 9, 10 and 13, the adjustable guide arm 150 extends between first and second ends, 152 and 154, respectively, and is comprised of a plate portion 156 and a tubular clamp portion 162 extending from the first end 152 thereof. The plate portion 156 includes a circular shaft bore 158 therethrough proximate to the second end 154, adapted to allow the shaft 130 to pass therethrough, and a guide rod bore 160 therethrough proximate to the first end 152, adapted to allow the guide rod 124 to pass therethrough. The tubular clamp portion 162 extends transversely from the plate portion 156 proximate to the first end 152 and is aligned with the guide rod bore 160, and is adapted to allow the guide rod 124 to pass therethrough. The tubular clamp portion 162 includes a set screw 164, as is commonly known, to secure the adjustable guide arm 150 to the guide rod 124. The adjustable guide arm 150 may be positioned and secured at any location along the guide rod 124 to allow for various strap 8 widths. While the guide rod 124 is illustrated in the current embodiment of the invention with a square cross section, it may be appreciated that other profiles, such as, by way of non-limiting example, a circular cross section, may be useful, as well.

In operation, the adjustable guide arm 150 may be located along the guide rod 124 corresponding to the width of the strap 8 to be wound, with the set screw 164 engaged to fix the position thereof. The strap guide assembly 230 may be positioned in the first position with the extendable spool guide swing arm 170 in the raised position, as illustrated in FIG. 7. A free end of the strap 8 may then be passed through the gap 266 from proximate the bottom edge 270 of the rear plate 260, and through the slot 140 between the adjustable guide arm 150 and the extendable spool guide swing arm 170, and the motor 102 turned on by the activation button 106 to rotate the shaft 130. As the strap 8 is wound into a roll, as illustrated in FIG. 7, the diameter of the roll may be such that it may engage upon the roller assembly 272, shown in FIGS. 9 and 10. Thereafter, as the roll increases in diameter, engaging upon the roller assembly 272, the strap guide assembly 230 and the extendable spool guide swing arm 170 may extend in length as required for the diameter of the roll, to the extended position as shown in FIG. 8. Thereafter, the hook 4 at the distal end of the strap 8 may engage upon the strap guide assembly 230, rotating the strap guide assembly 230 to the raised position, as seen in FIG. 11, thereby engaging the limit switch and ceasing operation of the motor 102. As the strap guide assembly 230 is rotated upwards, the rotation limit stop 218 prevents the extendable spool guide swing arm 170 from rotating upwards, as well, and thus the magnetic plate 196 is disengaged from the strap guide assembly 230 and extendable spool guide swing arm 170 rotates downwards to the second position shown in FIG. 11. Thereafter, the wound strap 8 may be slidably removed from the end of the shaft 130 quickly and neatly.

While specific embodiments of the invention have been described and illustrated, such embodiments should be considered illustrative of the invention only and not as limiting the invention as construed in accordance with the accompanying claims.

What is claimed is:

1. An apparatus for winding straps comprising:
    a motor having a shaft extending therefrom to a distal end, said shaft being rotatable thereby along a shaft axis and having a slot extending longitudinally therealong from said distal end;
    a spool guide swing arm located proximate to said distal end of said shaft adapted to retain a strap on said shaft;
    a strap guide front assembly located at the end of a strap guide extendable portion extending perpendicular to said shaft axis, said strap guide front assembly extending parallel to and spaced apart from said shaft axis,
    wherein said strap guide extendable portion is rotatable about said shaft axis between a first position substantially horizontally extending from said shaft and a second position past vertically above said shaft.
2. The apparatus of claim 1 further comprising a limit switch adapted to stop said motor when said strap guide extendable portion is at said second position.
3. The apparatus of claim 1 wherein said strap guide extendable portion is rotatably secured to a location proximate to said motor.
4. The apparatus of claim 1 wherein said strap guide front assembly includes a slot extending parallel to said shaft axis.
5. The apparatus of claim 4 wherein said slot is formed between front and rear plates.
6. The apparatus of claim 5 wherein said rear plate includes an extended tapered edge extending downwardly therefrom.
7. The apparatus of claim 5 wherein said rear plate includes a roller on a rear surface thereof.
8. The apparatus of claim 1 wherein said spool guide swing arm is rotatable about an axis parallel to said shaft axis.
9. The apparatus of claim 8 wherein said spool guide swing arm includes an extendable distal end portion.
10. The apparatus of claim 9 wherein said spool guide swing arm includes a magnet at said distal end portion adapted to engage upon said strap guide front assembly.
11. The apparatus of claim 10 wherein said spool guide swing arm includes a rotation limit stop adapted to prevent rotation of said spool guide swing arm above horizontal.
12. The apparatus of claim 1 further comprising an adjustable guide arm extending proximate to said shaft so as to position said strap between said adjustable guide arm and said spool guide swing arm.
13. A method for winding straps comprising:
    passing a free end of a strap through a slot in a shaft extending from a motor to a distal end, said shaft being rotatable thereby along a shaft axis;
    passing said strap through a strap guide front assembly located at the end of a strap guide extendable portion extending perpendicular to said shaft axis, said strap guide front assembly extending parallel to and spaced apart from said shaft axis; and
    rotating said shaft so as to wind said strap thereabout until a distal end of said strap engages upon said strap guide front assembly thereby rotating said strap guide extendable portion and said strap guide front assembly upwardly about said shaft; and
    disengaging a magnetic end of a spool guide swing arm located proximate to said distal end of said shaft so as to permit said spool guide swing arm to rotate downward permitting removal of said strap from said shaft.

* * * * *